(12) United States Patent
Lu et al.

(10) Patent No.: US 10,977,036 B2
(45) Date of Patent: Apr. 13, 2021

(54) MAIN MEMORY CONTROL FUNCTION WITH PREFETCH INTELLIGENCE

(71) Applicant: Intel Corporation, Santa Clara, CA (US)

(72) Inventors: Patrick Lu, Chandler, AZ (US); Karthik Kumar, Chandler, AZ (US); Thomas Willhalm, Sandhausen (DE); Francesc Guim Bernat, Barcelona (ES); Martin P. Dimitrov, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/336,884

(22) PCT Filed: Sep. 30, 2016

(86) PCT No.: PCT/EP2016/001631
§ 371 (c)(1),
(2) Date: Mar. 26, 2019

(87) PCT Pub. No.: WO2018/059656
PCT Pub. Date: Apr. 5, 2018

(65) Prior Publication Data
US 2019/0250916 A1    Aug. 15, 2019

(51) Int. Cl.
*G06F 12/08* (2016.01)
*G06F 9/30* (2018.01)
*G06F 12/0811* (2016.01)
*G06F 12/0862* (2016.01)
*G06F 9/38* (2018.01)

(52) U.S. Cl.
CPC ...... *G06F 9/30047* (2013.01); *G06F 9/30043* (2013.01); *G06F 9/30185* (2013.01); *G06F 9/383* (2013.01); *G06F 12/0811* (2013.01); *G06F 12/0862* (2013.01); *G06F 2212/1024* (2013.01); *G06F 2212/205* (2013.01);
(Continued)

(58) Field of Classification Search
CPC ............. G06F 12/0811; G06F 12/0862; G06F 9/30047; G06F 9/30185; G06F 9/383; G06F 9/30043; G06F 2212/2022; G06F 2212/2024; G06F 2212/6028; G06F 2212/1024; G06F 2212/205
See application file for complete search history.

(56) References Cited

U.S. PATENT DOCUMENTS 5,652,858 A     7/1997   Okada et al.
6,976,147 B1 *  12/2005  Isaac .................. G06F 12/0862
                                                      711/137
2014/0129767 A1  5/2014   Ramanujan et al.

OTHER PUBLICATIONS

International Search Report and Written Opinion for PCT Patent Application No. PCT/EP16/01631, dated Dec. 23, 2016, 14 pages.
(Continued)

*Primary Examiner* — Hiep T Nguyen
(74) *Attorney, Agent, or Firm* — Compass IP Law PC

(57) ABSTRACT

An apparatus is described. The apparatus includes main memory control logic circuitry comprising prefetch intelligence logic circuitry. The prefetch intelligence circuitry to determine, from a read result of a load instruction, an address for a dependent load that is dependent on the read result and direct a read request for the dependent load to a main memory to fetch the dependent load's data.

25 Claims, 10 Drawing Sheets

(52) U.S. Cl.
CPC ............... *G06F 2212/2022* (2013.01); *G06F 2212/2024* (2013.01); *G06F 2212/6028* (2013.01)

(56) References Cited

OTHER PUBLICATIONS

Liu, et al., "Semantics-Aware, Timely Prefetching of Linked Data Structure" Parallel and Distributed Systems (ICPADS), 2010 IEEE 16th International Conference, Dec. 8, 2010, pp. 213-220.
Roth, et al., "Dependence Based Prefetching for Linked Data Structures", Operating Systems Review, ACM, New York, vol. 32, No. 5, Oct. 1, 1998 pp. 115-126.

\* cited by examiner

MAIN MEMORY CONTROL FUNCTION WITH PREFETCH INTELLIGENCE

This application is a U.S. National Phase application under 35 U.S.C. § 371 of International Application No PCT/EP2016/001631, filed Sep. 30, 2016 entitled, "MAIN MEMORY CONTROL FUNCTION WITH PREFETCH INTELLIGENCE", which is incorporated by reference in its entirety.

FIELD OF INVENTION

The field of invention pertains generally to the computing sciences, and, more specifically, to a main memory control function with prefetch intelligence.

BACKGROUND

A pertinent issue in many computer systems is the main memory (also referred to as system memory). Here, as is understood in the art, a computing system operates by executing program code stored in main memory and reading/writing data that the program code operates on from/to main memory. As such, main memory is heavily utilized with many program code and data reads as well as many data writes over the course of the computing system's operation. Finding ways to improve main memory accessing performance is therefore a motivation of computing system engineers.

FIGURES

Figure 1:
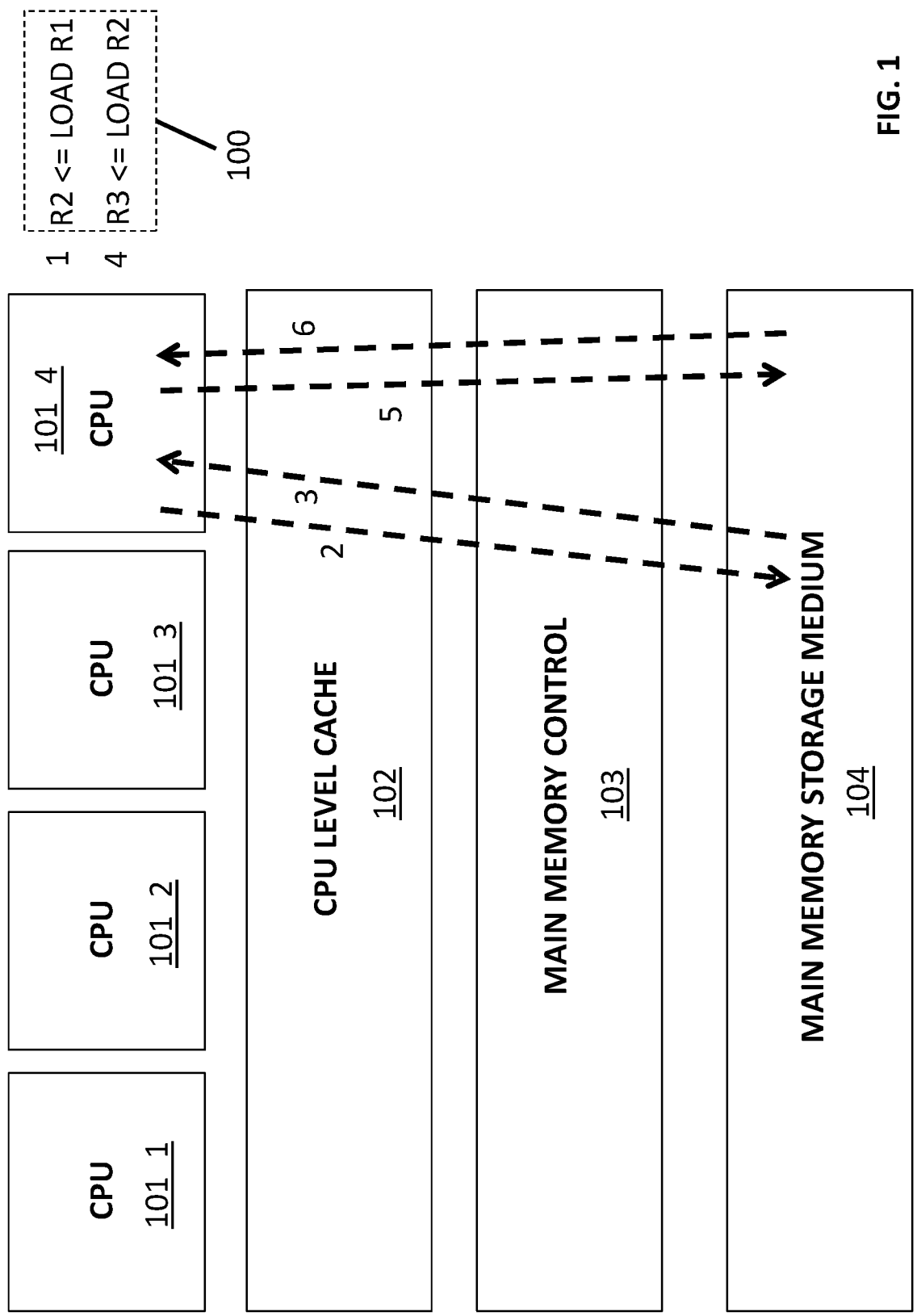
Figure 2:
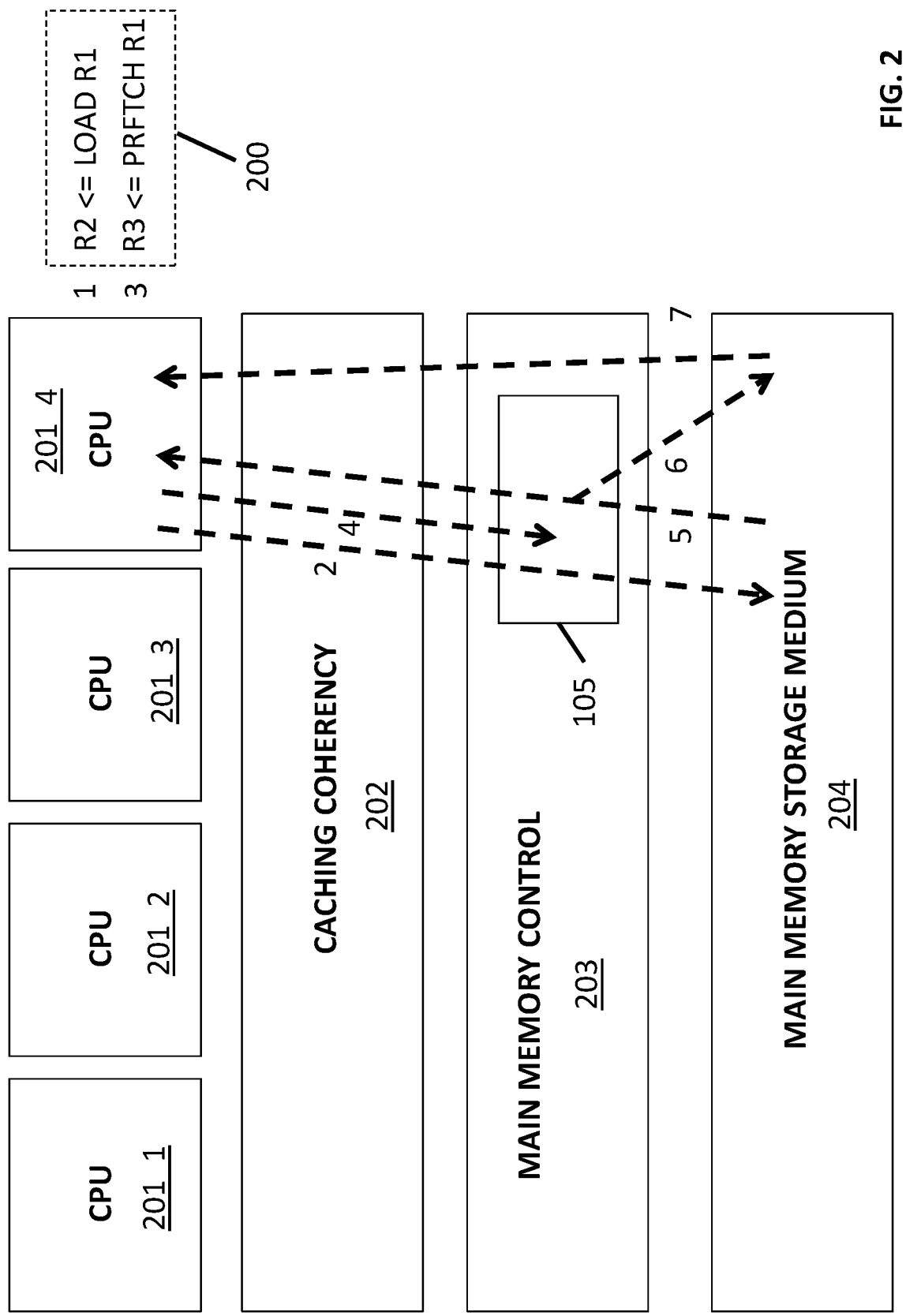
Figure 3:
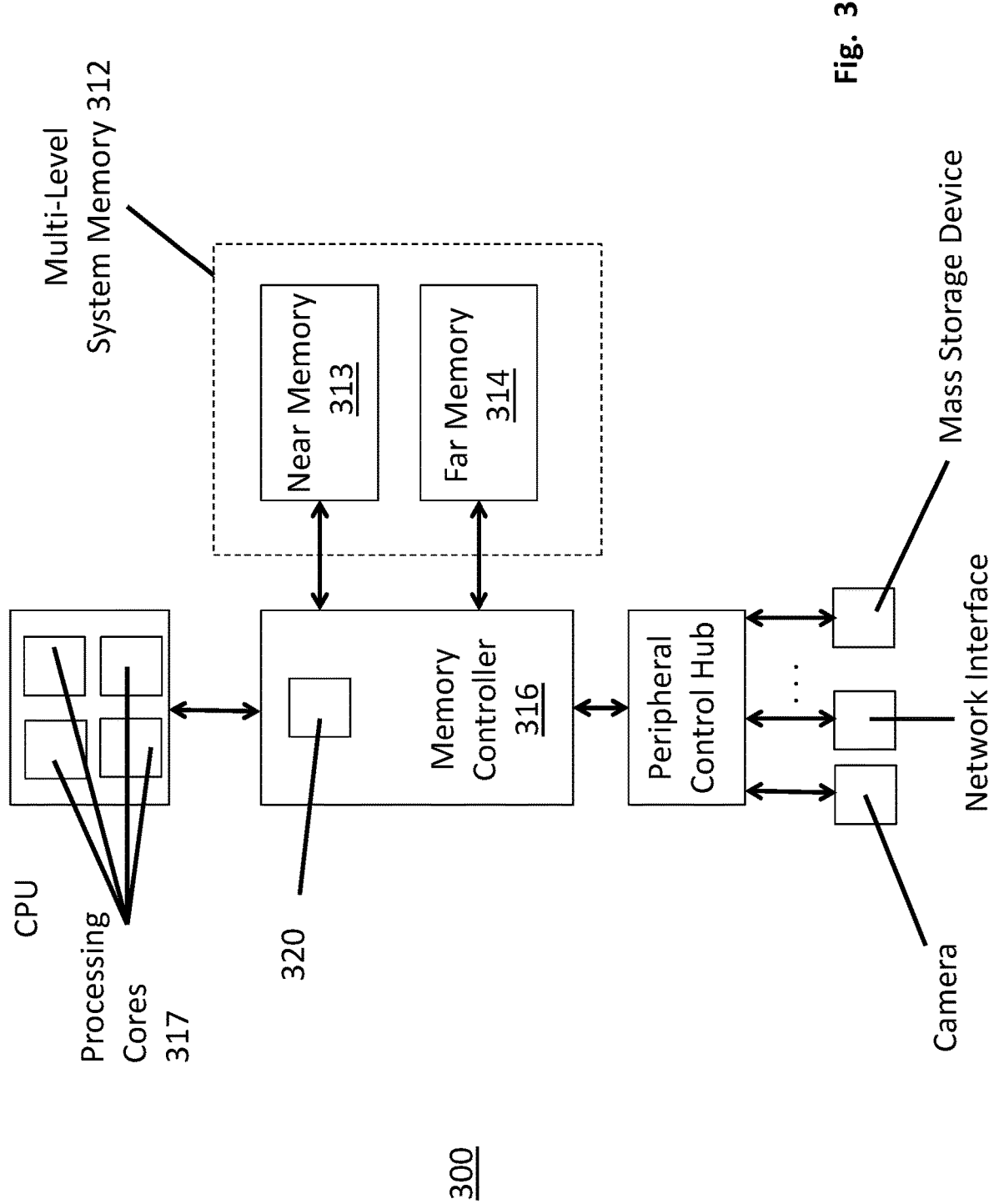
Figure 4:
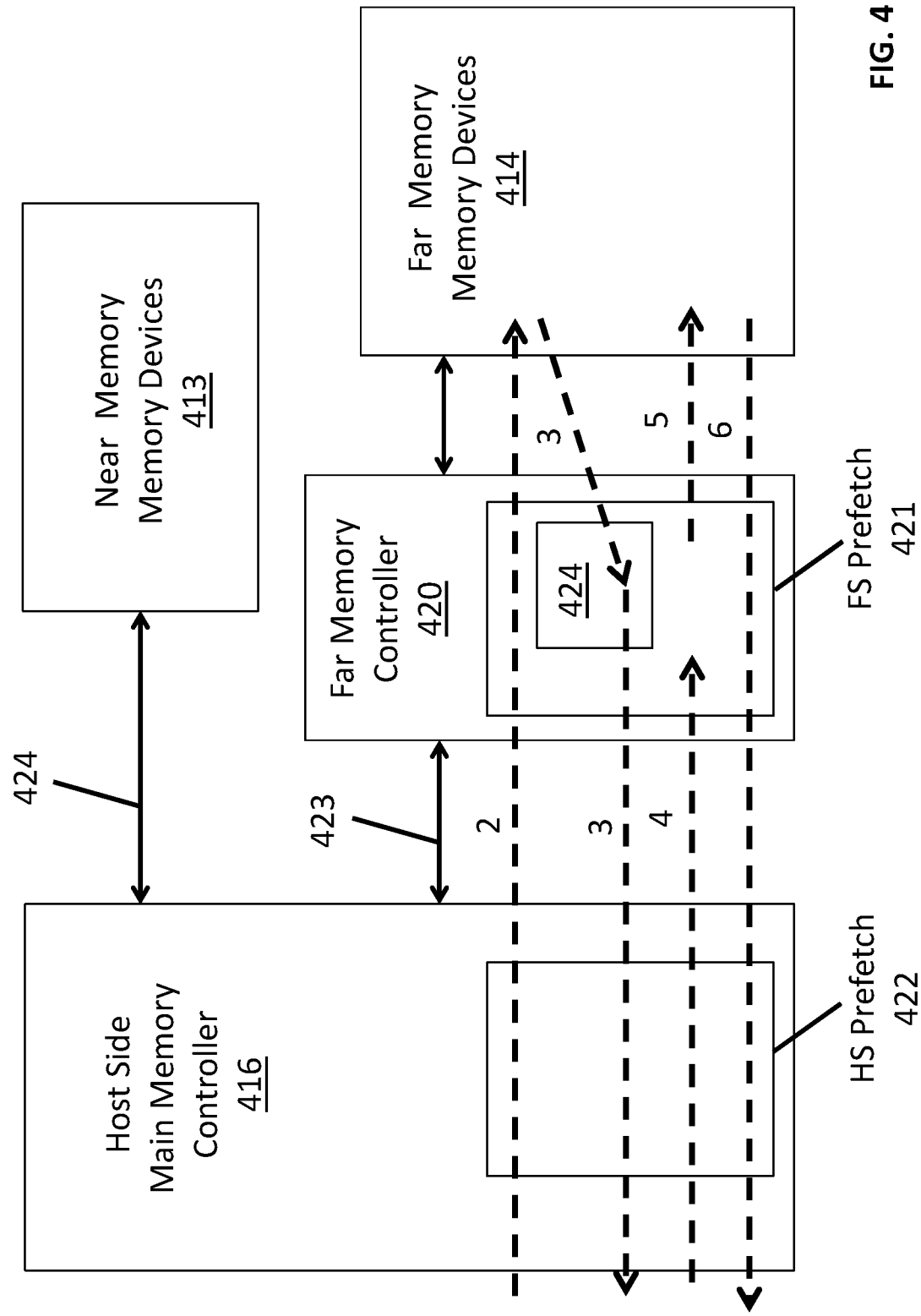
Figure 5:
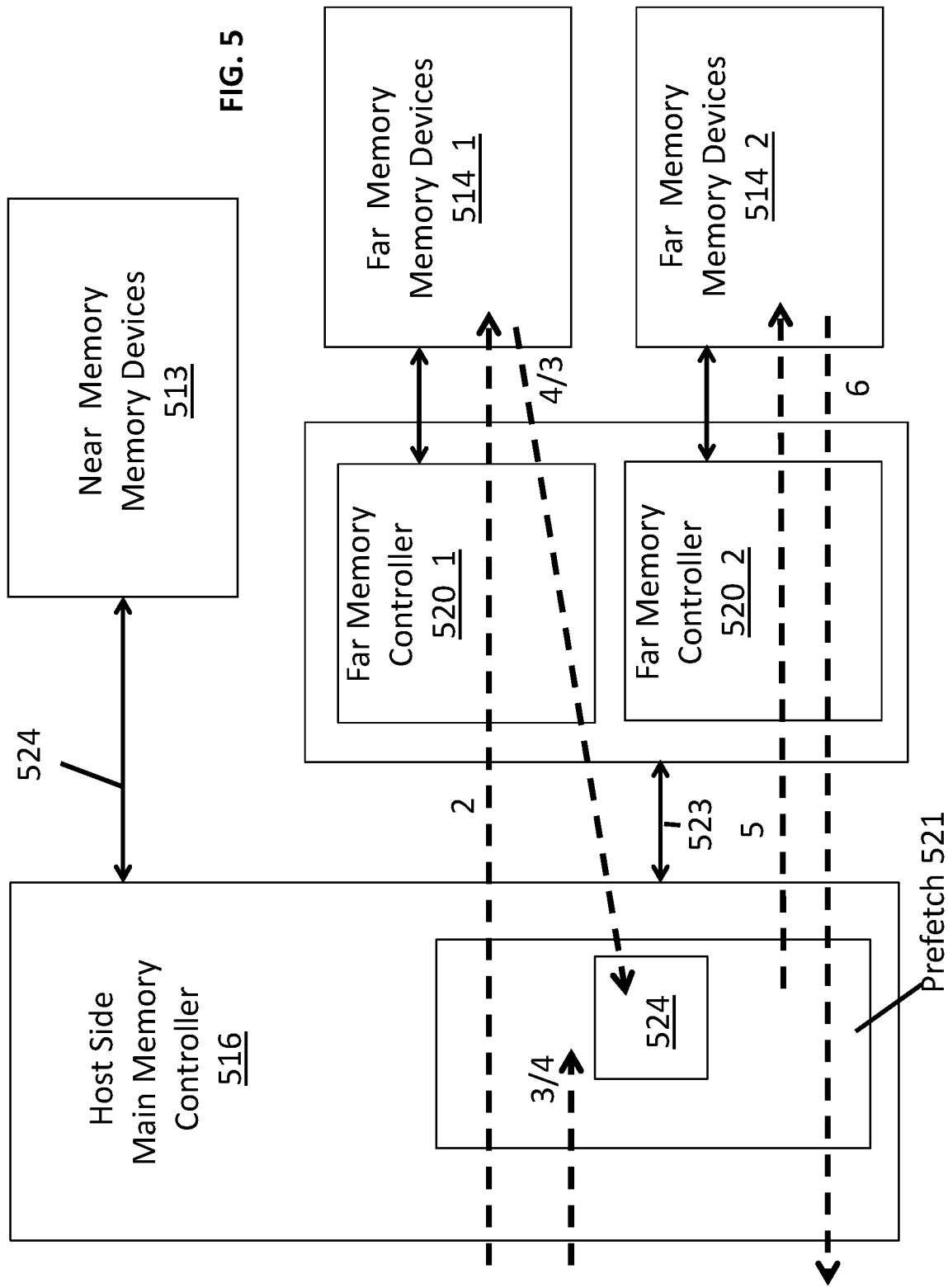
Figure 6:
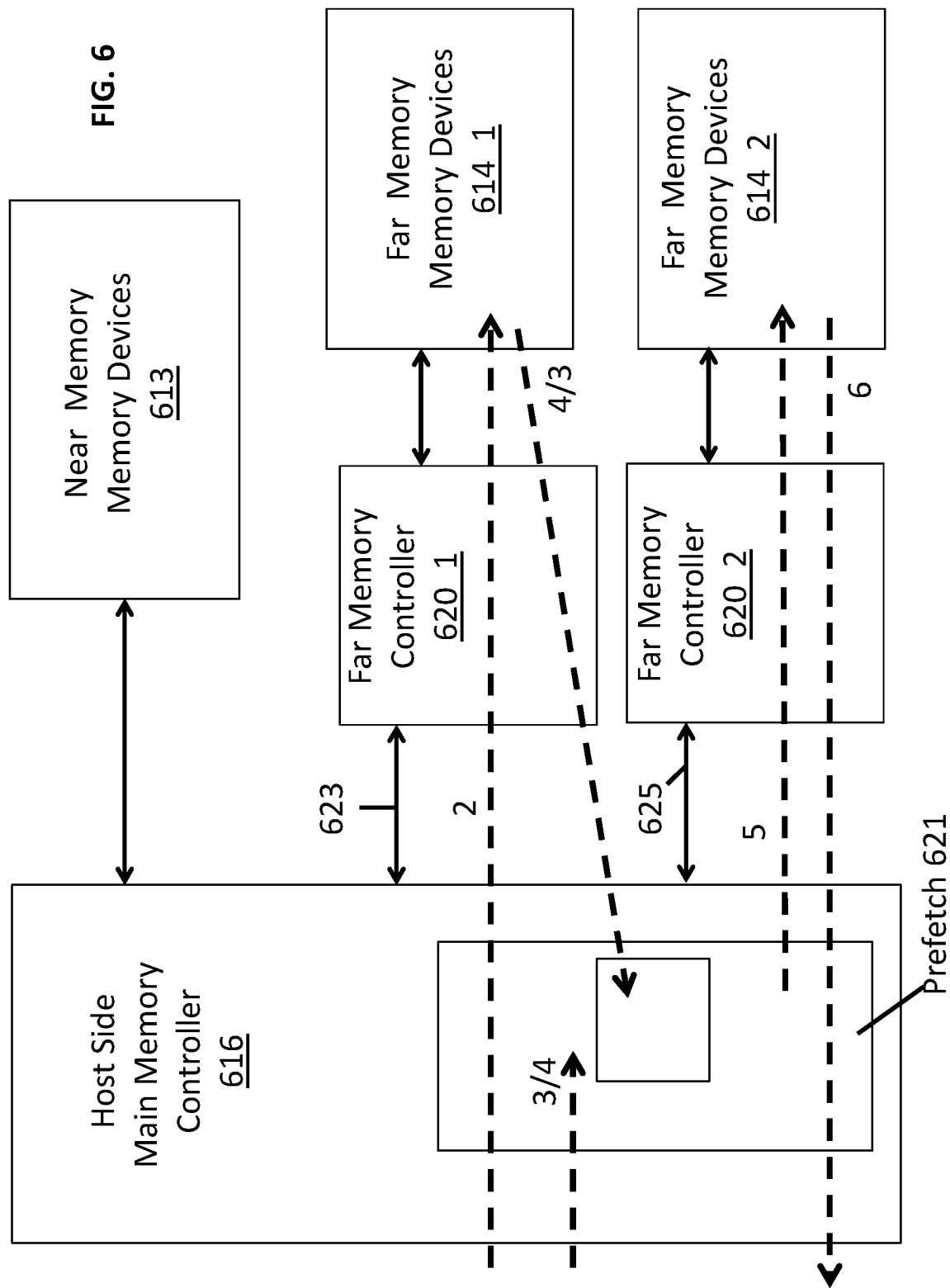
Figure 7:
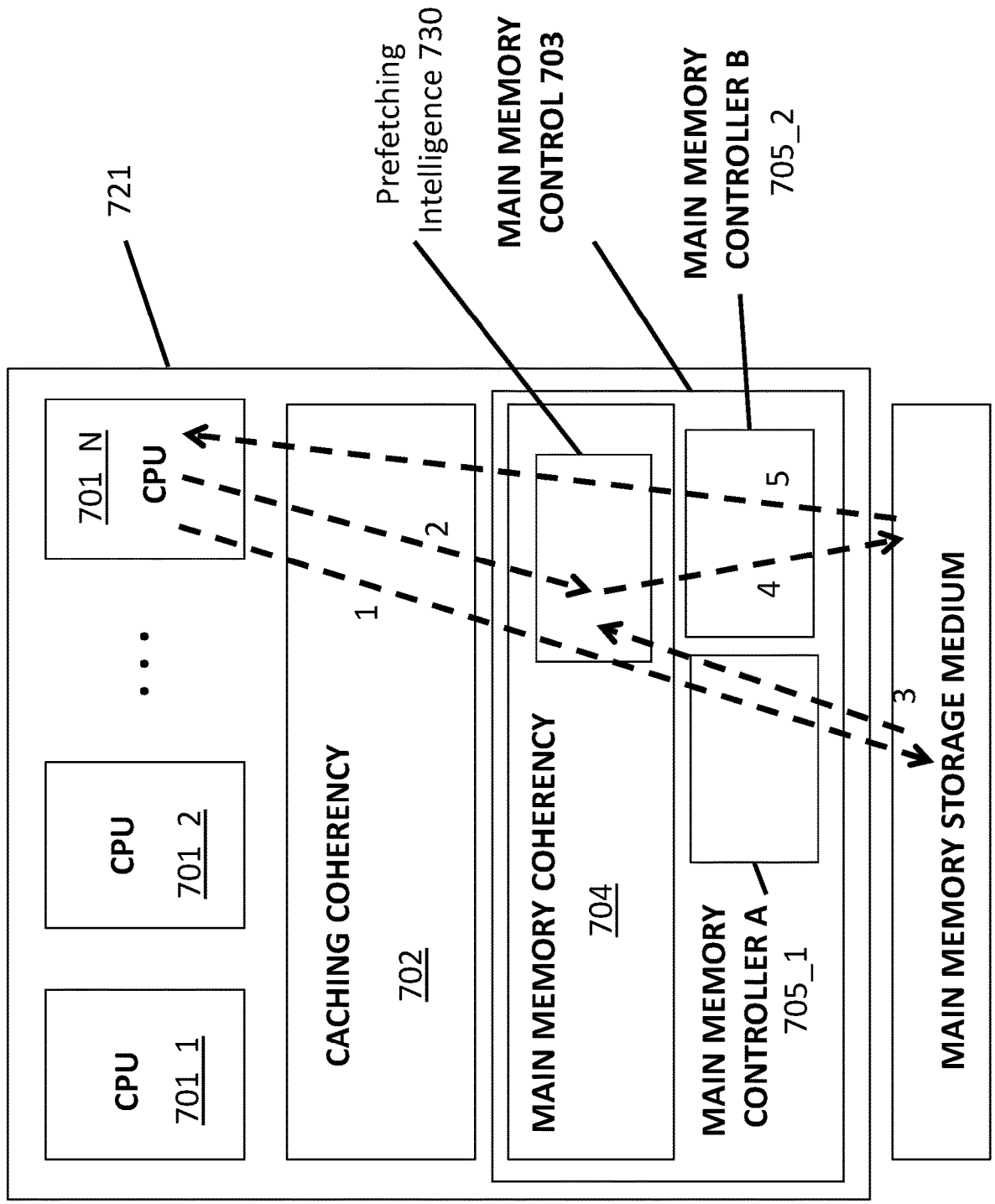
Figure 8:
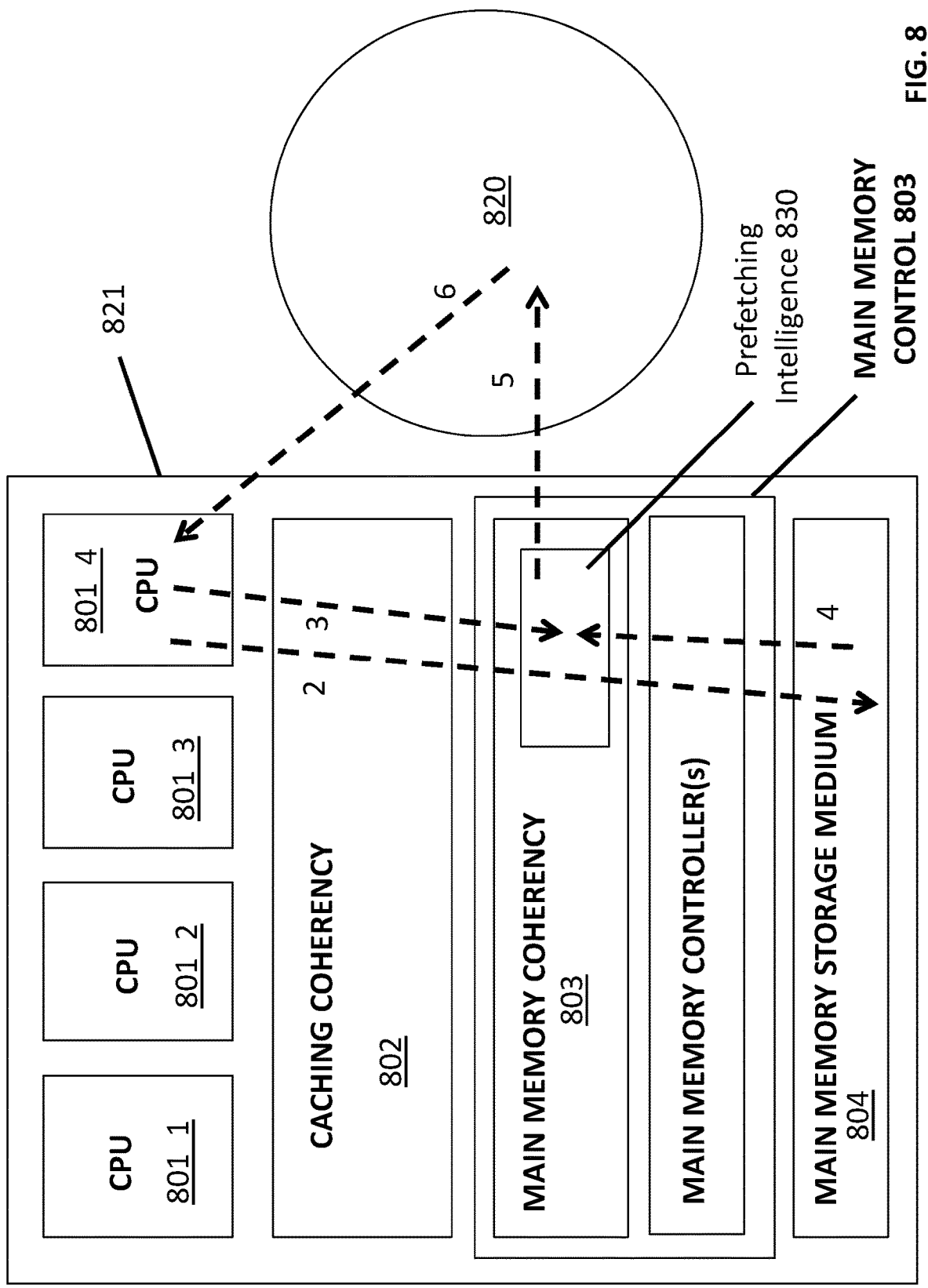
Figure 9:
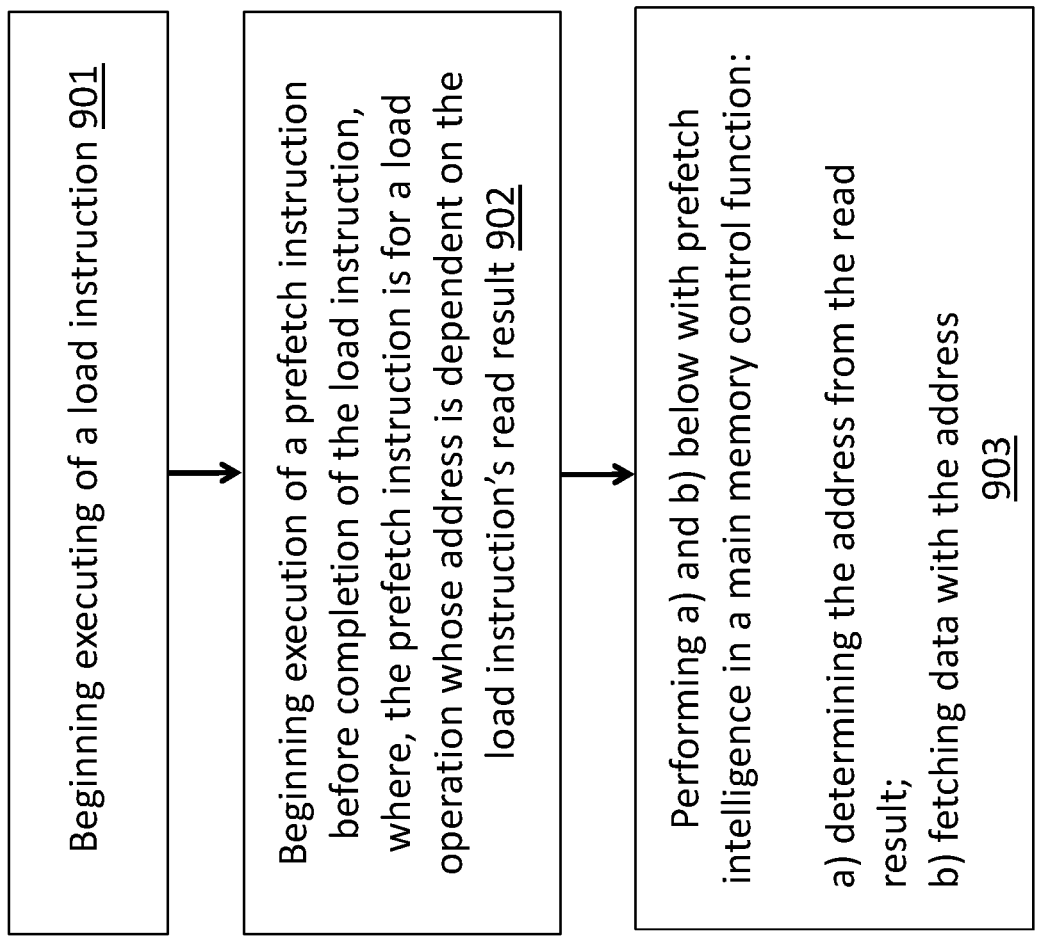
Figure 10:
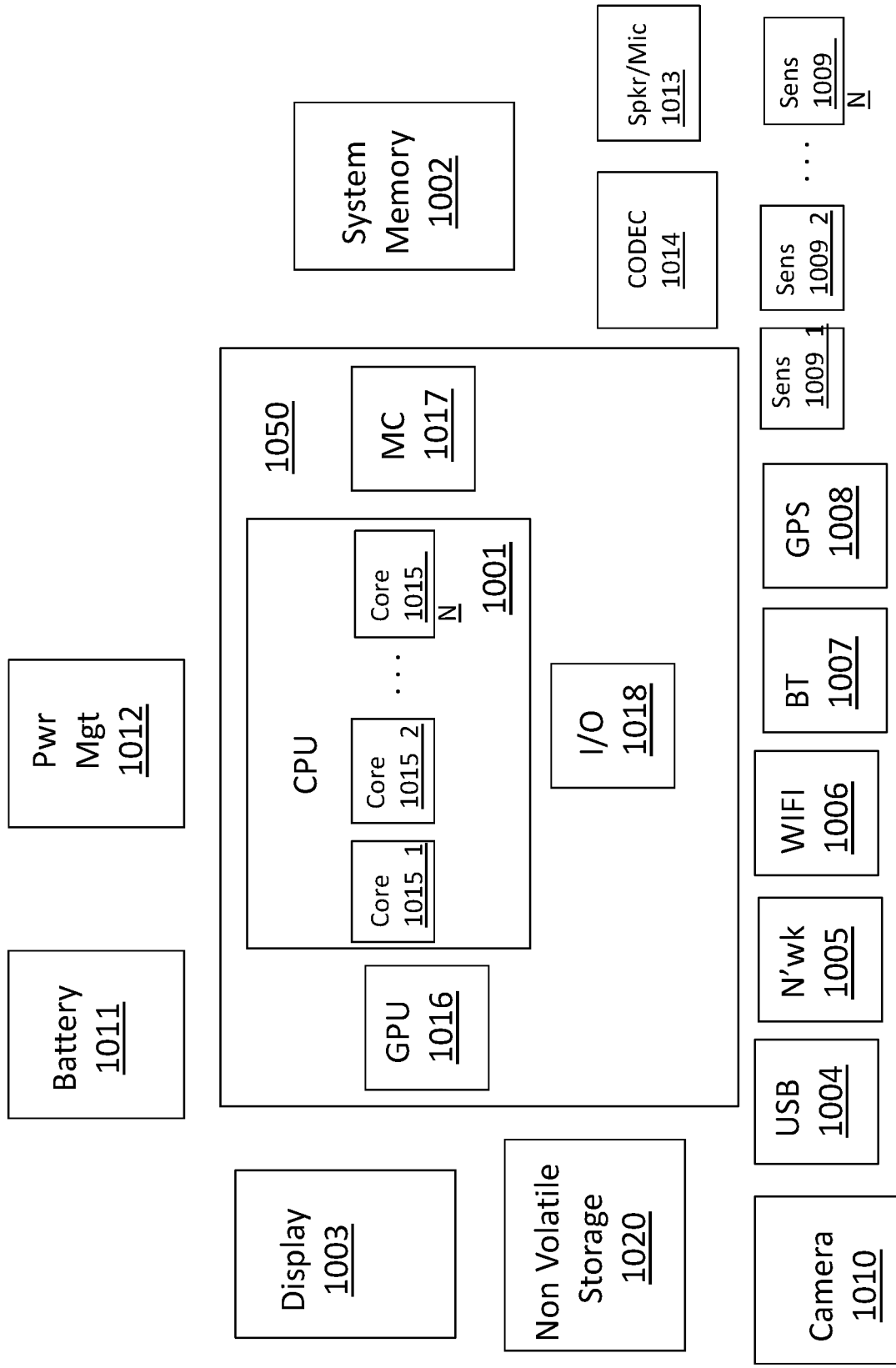

A better understanding of the present invention can be obtained from the following detailed description in conjunction with the following drawings, in which:

FIG. 1 shows a traditional dependent load operation;
FIG. 2 shows an improved dependent load operation;
FIG. 3 shows a multi-level system memory;
FIGS. 4 through 6 show more localized dependent load operational flows;
FIGS. 7 and 8 show more global dependent load operational flows;
FIG. 9 shows a methodology;
FIG. 10 shows a computing system.

DETAILED DESCRIPTION

1.0 Dependent Load Speed Up with Prefetch Instruction

A load instruction fetches data from main memory at an address specified by the load instruction. For instance, the instruction R2<=LOAD R1 will fetch data from memory at an address whose value resides in register R1 and will put the data that was read from the main memory at the specified address into register R2. A dependent load is a load instruction whose address is a function of the data that was fetched by a prior load instruction.

Instruction sequence 100 of FIG. 1 shows an example. Here, the second load instruction corresponds to a dependent load because the address that second load instruction will use to fetch its data from main memory is determined from the previous load instruction. That is, the previous load instruction places its read return in register R2 and the second (dependent) load instruction uses the value in R2 as the address for its system memory read. Other kinds of dependent loads may exist where the address of the data to be fetched by the dependent load is a function of the data fetched by the prior load (such as adding an offset to the data fetched by the prior load).

Referring to FIG. 1, the traditional approach for handling a dependent load is depicted through process flow 1-7. As observed in FIG. 1, the initial (prior) load instruction begins execution 1. In response to the initial instruction beginning execution 1, the sought for data (at an address value found in register R1) is first looked 2 for in a cache 102 that caches, e.g., cache lines for multiple processors 101_1 through 101_4 including the processor 101_4 that is executing the dependent load instruction sequence 100.

Here, for instance, the processors 101_1 through 101_4 may be processing cores within a large system on chip (SoC) where the cache 102 is, e.g., associated with a last level cache on the SoC. With the data not being found in the cache 102, the load instruction is serviced by forwarding the load request 2 to a main memory control function 103 (e.g., a main memory controller also referred to as a system memory controller) that is, e.g., also integrated on the same SoC. The main memory controller 103 then fetches the desired data at the address value found in R1 and forwards 3 the data back to the processing core 101_4 that began execution of the first load instruction.

Once the processing core 101_4 receives the returned data value, the initial load instruction completes execution and places the read data value into register R2. With the completion of the first load instruction, the CPU 101_4 can determine the address for the dependent load instruction (it is the value in R2) and begin execution 4 of the dependent load instruction which specifies the value in R2 as the address. The data targeted by the dependent load instruction may then be retrieved from the cache 102, or, main memory 104 if not found in cache 102 (FIG. 1 shows the later via flows 5 and 6).

A problem with the traditional dependent load operation is the time delay associated with the complete transversal through the system of the data fetched by the first load instruction before the second (dependent) load instruction can begin execution. That is, the time to complete the first instruction may consume a considerable amount of time. As such, the software thread that includes the instruction sequence 100 can stall for an expanse of time from the beginning of execution of the first instruction to the completion of the execution of the first instruction.

FIG. 2 shows an improved approach in which dependent load fetching intelligence 105 (also referred to as prefetching intelligence, prefetch intelligence, prefetch logic and the like) is integrated into the main memory control function 103. With the presence of the prefetch intelligence 105, the dependent load instruction can begin execution 3 much earlier and does not need to wait until completion of the first instruction. A dependent load instruction that begins earlier than the completion of the load instruction that it depends upon can be viewed as a new type of instruction, hereinafter referred to as a prefetch instruction (PRFTCHP).

In an embodiment, as alluded to just above, a prefetch instruction is a special type of load instruction that can be inserted into the program code (e.g., by a compiler) in place of a traditional dependent load instruction. Unlike a traditional load instruction, the prefetch instruction does not have to wait to begin execution until completion of the earlier load instruction that it depends upon. Rather, in one embodiment, the prefetch instruction is free to begin 3 once a miss has been confirmed at the cache 202 and the main memory control function 203 has confirmed its reception of the internal command 2 that was generated from the beginning of the execution 1 of the first load instruction. That is, once the main memory function 203 has confirmed receipt of the read request 2 from initial load instruction, the prefetch instruction can begin execution 3.

In an embodiment, the internal read request 2 that is generated from the initial load instruction includes a hint or other meta data that indicates that a following prefetch command will be issued whose address is dependent on the data being requested by the read request 2. In various embodiments the hint may be generated dynamically during runtime by hardware that analyzes program code yet to be analyzed in an instruction queue (or by a just in time compiler), or, the hint may be added statically pre-runtime by a compiler that inserts the hint into the instruction format of the first instruction.

After a miss of the first request 2 at the cache 202 and conformation of reception of the forwarded read request 2 by the main memory control function 103, the prefetch instruction is permitted to begin execution 3. With the beginning of execution 3 of the prefetch instruction, another internal read request 4 is issued for the dependent load. In an embodiment, the read request 4 includes meta data that specially references the earlier read request 2 so that the hardware understands which prefetch load is dependent on which earlier read request. In a further embodiment, the meta data corresponds to the address of the earlier load command. Thus, for example, if the address of the earlier load instruction is found in register R1, the following prefetch command will also include the address found in register R1.

The prefetch intelligence 205 within the memory control function 203 is able to recognize both the second read request 4 from the prefetch instruction and the returned data value 5 from the first read request 2. With knowledge of a read request 4 for a prefetch command that references a particular earlier read request 2 and with knowledge of the returned value 5 of the earlier read request 2, the prefetch intelligence 105 locally constructs a read request 6 that is issued to the main memory 204 directly from the main memory control function 203. Thus, shortly after the data from the first load operation is read 5 from system memory 204, the data value for the second dependent load is also read 7 from the system memory 204.

Both read results 5, 7 are subsequently provided to the CPU 101_4. Importantly, the result 7 of the dependent load arrives at the CPU 101_4, ideally, only a short time after the result 5 of the first load arrives, which, in turn, results in only a brief stall time of the thread that contains the dependent load instruction sequence 200.

Recall from the above discussion that the initial read request 2 may include meta data that indicates a following load will be dependent upon it. In further embodiments, this meta-data may be enhanced to also indicate or otherwise describe the mathematical function that is to be applied to the result of the first read 5 to determine the address of the second read 6 (e.g., which portion of the first read data corresponds to the address of the dependent load, an offset to be added to the data of the first read to determine the address of the dependent load, some other mathematical operation, etc.). By including meta-data in the initial read request 2 that indicates how the dependent load's address is to be calculated from the initial load, the system can, e.g., opportunistically issue a prefetching read request for the dependent load before the read request 6 for the dependent load before main memory control 203 receives the read request 4 for the dependent load or perhaps even before the prefetch instruction 3 executes.

In same or other embodiments meta data that describes the mathematical operation to be applied to the initial read's return data is alternatively or also included in the dependent load's read request 4. By so doing the main memory control 203 function is assured of being able to generate the correct dependent load address at least with the arrival of the second, dependent load read request 4.

Although the prefetch instruction and associated flow described above can be used with any system memory including a traditional system memory having only volatile (e.g., dynamic random access memory (DRAM)) memory devices, the prefetch instruction and associated flow described above is believed to be particularly helpful in emerging system memory systems such as a multi-level system memory in which one of the system memory levels employs an emerging non volatile memory technology that has slower access times that DRAM and/or a slower DRAM solution (e.g., a low power DRAM solution having a slower clock speed).

As such, with the presence of a slower memory technology being present in the system memory, the delay between the initial read 2 and its return 5 can be noticeably longer than with main memory systems having only full speed DRAM. As such, the prefetch instruction and its corresponding flow acts as a form of speed-up that compensates for the slower system memory access time by moving up in time when the read 6 for the dependent load occurs (as compared to the traditional approach of FIG. 1). A discussion of multi-level system memories is provided immediately below.

2.0 Multi-Level System Memory

FIG. 3 shows an embodiment of a computing system 300 having a multi-tiered or multi-level system memory 312. According to various embodiments, a smaller, faster near memory 313 may be utilized as a cache for a larger far memory 314.

In the case where near memory 313 is used as a cache, near memory 313 is used to store an additional copy of those data items in far memory 314 that are expected to be more frequently called upon by the computing system. By storing the more frequently called upon items in near memory 313, the system memory 312 is observed as faster because the system often reads items that are being stored in faster near memory 313. For an implementation using a write-back technique, the copy of data items in near memory 313 may contain data that has been updated by the CPU, and is thus more up-to-date than the data in far memory 314. The process of writing back 'dirty' cache entries to far memory 314 ensures that such changes are not lost.

According to various embodiments, near memory cache 313 has lower access times than the lower tiered far memory 314 region. For example, the near memory 313 may exhibit reduced access times by having a faster clock speed than the far memory 314. Here, the near memory 313 may be a faster (e.g., lower access time), volatile system memory technology (e.g., high performance dynamic random access memory (DRAM)) and/or static random access memory (SRAM) memory cells co-located with the memory controller 316. By contrast, far memory 314 may be either a volatile memory technology implemented with a slower clock speed (e.g., a DRAM component that receives a slower clock) or, e.g., a non volatile memory technology that is slower (e.g., longer access time) than volatile/DRAM memory or whatever technology is used for near memory.

For example, far memory 314 may be comprised of an emerging non volatile random access memory technology such as, to name a few possibilities, a phase change based memory, a three dimensional crosspoint memory, "write-in-place" non volatile main memory devices, memory devices having storage cells composed of chalcogenide, multiple level flash memory, multi-threshold level flash memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc. Any of these technologies may be byte addressable so as to be implemented as a main/system memory in a computing system.

Emerging non volatile random access memory technologies typically have some combination of the following: 1) higher storage densities than DRAM (e.g., by being constructed in three-dimensional (3D) circuit structures (e.g., a crosspoint 3D circuit structure)); 2) lower power consumption densities than DRAM (e.g., because they do not need refreshing); and/or, 3) access latency that is slower than DRAM yet still faster than traditional non-volatile memory technologies such as FLASH. The latter characteristic in particular permits various emerging non volatile memory technologies to be used in a main system memory role rather than a traditional mass storage role (which is the traditional architectural location of non volatile storage).

Regardless of whether far memory 314 is composed of a volatile or non volatile memory technology, in various embodiments far memory 314 acts as a true system memory in that it supports finer grained data accesses (e.g., cache lines) rather than only larger based "block" or "sector" accesses associated with traditional, non volatile mass storage (e.g., solid state drive (SSD), hard disk drive (HDD)), and/or, otherwise acts as an (e.g., byte) addressable memory that the program code being executed by processor(s) of the CPU operate out of.

Because near memory 313 acts as a cache, near memory 313 may not have formal addressing space. Rather, in some cases, far memory 314 defines the individually addressable memory space of the computing system's main memory. In various embodiments near memory 313 acts as a cache for far memory 314 rather than acting a last level CPU cache. Generally, a CPU cache is optimized for servicing CPU transactions, and will add significant penalties (such as cache snoop overhead and cache eviction flows in the case of cache hit) to other system memory users such as Direct Memory Access (DMA)-capable devices in a Peripheral Control Hub. By contrast, a memory side cache is designed to handle, e.g., all accesses directed to system memory, irrespective of whether they arrive from the CPU, from the Peripheral Control Hub, or from some other device such as display controller.

In various embodiments, system memory may be implemented with dual in-line memory module (DIMM) cards where a single DIMM card has both volatile (e.g., DRAM) and (e.g., emerging) non volatile memory semiconductor chips disposed in it. In an embodiment, the DRAM chips effectively act as an on board cache for the non volatile memory chips on the DIMM card. Ideally, the more frequently accessed cache lines of any particular DIMM card will be accessed from that DIMM card's DRAM chips rather than its non volatile memory chips. Given that multiple DIMM cards may be plugged into a working computing system and each DIMM card is only given a section of the system memory addresses made available to the processing cores 317 of the semiconductor chip that the DIMM cards are coupled to, the DRAM chips are acting as a cache for the non volatile memory that they share a DIMM card with rather than as a last level CPU cache.

In other configurations DIMM cards having only DRAM chips may be plugged into a same system memory channel (e.g., a DDR channel) with DIMM cards having only non volatile system memory chips. Ideally, the more frequently used cache lines of the channel are in the DRAM DIMM cards rather than the non volatile memory DIMM cards. Thus, again, because there are typically multiple memory channels coupled to a same semiconductor chip having multiple processing cores, the DRAM chips are acting as a cache for the non volatile memory chips that they share a same channel with rather than as a last level CPU cache.

In yet other possible configurations or implementations, a DRAM device on a DIMM card can act as a memory side cache for a non volatile memory chip that resides on a different DIMM and is plugged into a same or different channel than the DIMM having the DRAM device. Although the DRAM device may potentially service the entire system memory address space, entries into the DRAM device are based in part from reads performed on the non volatile memory devices and not just evictions from the last level CPU cache. As such the DRAM device can still be characterized as a memory side cache.

In another possible configuration, a memory device such as a DRAM device functioning as near memory 313 may be assembled together with the memory controller 316 and processing cores 317 onto a single semiconductor device or within a same semiconductor package. Far memory 314 may be formed by other devices, such as slower DRAM or non-volatile memory and may be attached to, or integrated in that device. Alternatively, far memory may be external to a package that contains the CPU cores and near memory devices.

A far memory controller may also exist between a main memory controller and far memory devices (alternatively, the far memory controller can also be viewed as a component of the main memory controller). The far memory controller may be integrated within a same semiconductor chip package as CPU cores and a main memory controller, or, may be located outside such a package (e.g., by being integrated on a DIMM card having far memory devices). A far memory controller may also be integrated within a main or host side memory controller.

In still other embodiments, at least some portion of near memory 313 has its own system address space apart from the system addresses that have been assigned to far memory 314 locations. In this case, the portion of near memory 313 that has been allocated its own system memory address space acts, e.g., as a higher priority level of system memory (because it is faster than far memory) rather than as a memory side cache. In other or combined embodiments, some portion of near memory 313 may also act as a last level CPU cache.

In various embodiments when at least a portion of near memory 313 acts as a memory side cache for far memory 314, the memory controller 316 and/or near memory 313 may include local cache information (caching meta data) 320 so that the memory controller 316 can determine whether a cache hit or cache miss has occurred in near memory 313 for any incoming memory request.

In the case of an incoming write request, if there is a cache hit, the memory controller 316 writes the data (e.g., a 64-byte CPU cache line or portion thereof) associated with the request directly over the cached version in near memory 313. Likewise, in the case of a cache miss, in an embodiment, the memory controller 316 also writes the data associated with the request into near memory 313 which may cause the eviction from near memory 313 of another cache line that was previously occupying the near memory 313 location where the new data is written to. However, if the evicted cache line is "dirty" (which means it contains the most recent or up-to-date data for its corresponding system memory address), the evicted cache line will be written back to far memory 314 to preserve its data content.

In the case of an incoming read request, if there is a cache hit, the memory controller 316 responds to the request by reading the version of the cache line from near memory 313 and providing it to the requestor. By contrast, if there is a cache miss, the memory controller 316 reads the requested cache line from far memory 314 and not only provides the cache line to the requestor (e.g., a CPU) but also writes another copy of the cache line into near memory 313. In various embodiments, the amount of data requested from far memory 314 and the amount of data written to near memory 313 will be larger than that requested by the incoming read request. Using a larger data size from far memory or to near memory increases the probability of a cache hit for a subsequent transaction to a nearby memory location.

In general, cache lines may be written to and/or read from near memory and/or far memory at different levels of granularity (e.g., writes and/or reads only occur at cache line granularity (and, e.g., byte addressability for writes/or reads is handled internally within the memory controller), byte granularity (e.g., true byte addressability in which the memory controller writes and/or reads only an identified one or more bytes within a cache line), or granularities in between.) Additionally, note that the size of the cache line maintained within near memory and/or far memory may be larger than the cache line size maintained by CPU level caches.

Different types of near memory caching implementation possibilities exist. Examples include direct mapped, set associative, fully associative. Depending on implementation, the ratio of near memory cache slots to far memory addresses that map to the near memory cache slots may be configurable or fixed.

3.0 Implementations of a Dependent Load Speed Up with Prefetch Instruction

FIGS. 4 through 6 below depicts various ways in which prefetch logic can be integrated into a memory controller function to support operation of the aforementioned prefetch discussion. Each of FIGS. 5 through 7 show a far memory controller 420/520/620. Recall from the preceding discussion that a far memory controller may architecturally reside between the actual far memory devices 414/514/614 and a host side memory controller 416/516/616. In one embodiment, a far memory controller 420/520/620 is disposed on a DIMM card having the far memory non volatile memory devices 414/514/614 that is plugged into a memory channel 423/523/623 (e.g., a DDR channel) that is coupled to a host side main memory controller 416, 516, 616. Here, the near memory devices 413/513/613 may also be plugged into the same or different memory channel.

As such, memory channel 424/524/624 may correspond to a physical memory channel or a logical memory channel That is, if the near memory devices 413/513/613 are plugged into the same physical memory channel as the far memory devices 414/514/614, then memory channels 423, 424/523, 524/623, 624 correspond to the same physical channel (e.g., same actual DDR memory channel) but different logic channels (e.g., far memory devices 414/514/614 are communicated to by the host side memory controller 416/516/616 with a different protocol than the protocol that the near memory devices 413/513/613 are communicated to with).

In the case where channels 423, 424/523, 524/623, 624 correspond to a same physical memory channel, at least a portion of near memory devices 413/513/613 may be integrated on a same DIMM card as at least a portion of far memory devices 414/514/614. Alternatively, the near memory devices 413/513/613 may be on one or more different DIMM cards than the DIMM card(s) holding the far memory devices 414/514/614. By contrast, if the near memory devices 413/513/613 are plugged into a different physical memory channel than channels 423, 424/523, 524/623, 624 correspond to different physical memory channels.

In yet other embodiments, the far memory controller 420/520/620 is integrated in a same semiconductor chip package as the far memory devices 414/514/614. For example, a single stacked semiconductor chip package may include a stack of far memory devices 414/514/614 and the far memory controller 420/520/620. In still yet other embodiments the far memory controller 420/520/620 may be integrated into the host side memory controller 416/516/616.

FIG. 4 shows integration of the aforementioned prefetching intelligence 421 in a far memory controller 420. Here, the initial read request 2 is directed from the host side memory controller 416 to the far memory controller 420. The prefetch intelligence 421 observes the hint in the read request 2 that a subsequent load will be dependent on the read. As such, the return data 3 from the read request 2 is not only forwarded to the host side memory controller 416 for re-forwarding to the requesting CPU but is also cached in a local cache 424 within the far memory controller 420.

Upon the second read request 4 for the dependent load being sent to the far memory controller 420, the prefetch intelligence 421 in the far memory controller 420 uses its attached hint (e.g., the address of the first read request 2) to link the read data from the initial read request 2 that is presently sitting in cache 424 and calculates an address for the second read request 4. If the calculated address for the dependent load corresponds to a system memory address that is within the system memory address range serviced by the far memory controller 420, then a read request 5 for the dependent load is sent from the far memory controller 420 to a far memory chip that is oversees. The read data 6 is forwarded to the main memory controller 416 for re-forwarding to the requesting CPU and the read data 3 from the initial read request 2 is marked as being eligible for overwrite.

Here, in an embodiment, the main memory controller 416 forwards the read request 4 for the dependent load to the far memory controller 420 optimistically in that it does not know the address for the dependent load. As such, it is possible that the address of the dependent load does not fall within a system memory address range serviced by the far memory controller 420. In an embodiment, the far memory controller 420 includes configuration register space that informs it of the system memory addresses it supports so it can determine whether or not it is responsible for handling the address of the dependent load. If the far memory controller does not service an address range that the dependent load falls within, the far memory controller 420 sends a communication to the host side memory controller 416 that includes the address for the dependent load (and/or the resultant 3 of the initial read request) and can also include an indication that the data targeted by the dependent load cannot be fetched by the host side memory controller 416.

In an alternate embodiment, the far memory controller 420 may pessimistically forward the read result 3 to the host side memory controller 416 before it receives the read request 4 for the dependent load (the far memory controller 420 may or may not cache the read result 3 in a local cache 424 depending on implementation). In this case, the host side memory controller 416 may be able to determine the address of the dependent load before the host side memory controller 416 actually receives the read request for the dependent load. If so, the host side memory controller 416 can knowingly direct the read request for the dependent load to the correct system memory device to retrieve the correct data.

In still yet other embodiments, the far memory controller 420 may include configuration register space that causes it to opportunistically cache (or not opportunistically cache) the initial read result 3 in its local cache 424 and/or configuration register space that causes it to pessimistically forward (or not pessimistically forward) the initial read result 3 to the host side memory controller. The far memory controller may also include configuration space that establishes the mathematical operation to be applied on the initial read data to determine the address of the dependent load (e.g., which portion of the read data, which portion of the read data plus any offset, some other mathematical operation, etc.).

As discussed above, however, the read request of the initial load operation may include meta-data that describes the mathematical operation to be applied to the read data of the initial load. By passing this information to the prefetch intelligence that determines the address of the conditional load from the read data of the initial load, different mathematical operations can be applied to different initial/conditional load operation pairs. The meta data may be determined dynamically or may be inserted, e.g., pre runtime by a compiler. In same or other embodiments such meta data may at least be included in the second dependent read request so that the prefetching intelligence understands how to determine the address of the dependent load.

Note that although the above discussion of FIG. 4 pertained to a far memory controller that serviced a far memory, a traditional DRAM memory may be implemented in other embodiments. In this case, the activities of the far memory controller may be performed, e.g., by a controller disposed on a DRAM DIMM card (or otherwise integrated with memory devices or the host side memory controller 416) and memory devices 414 correspond to DRAM semiconductor chips. Alternatively the flow may be performed on near memory 413 in a multi-level system memory where near memory 413 has its own reserved system memory address space.

Continuing the discussion of multi-level system memory implementations, embodiments where near memory 413 acts as a memory side cache for far memory 414, the above described flows can be followed if both the initial read request and the conditional read request correspond to a cache miss in near memory. In various embodiments, the host side memory controller 416 can include prefetching intelligence 422 to handle near memory cache hits or misses for either the initial load or the dependent load.

Specifically, in various embodiments, the near memory cache may be initially snooped for the initially requested data. If there is a cache hit, the host side memory controller 416 with prefetch intelligence 422, with knowledge that a subsequent dependent load is forthcoming, forwards the returned data to the requesting CPU and determines the address of the dependent load from the data returned from near memory cache. The host side memory controller 416 may then wait for the expected read request before fetching the dependent load, or, may even immediately begin a read process for the dependent load before its read request arrives. After the fetching the dependent load data and receiving the dependent load's read request, the host side memory controller 416 is able to respond to the dependent load's read request.

FIG. 5 shows a situation, discussed briefly above, where the data for the dependent load is not within a system memory address range serviced by the far memory controller 420_1 that the initial read request 2 falls within. Here, the host side memory controller 516 includes configuration information or tables that describe which far memory controller and/or which physical channel is responsible for handling which system memory address range. In the particular situation of FIG. 5, the far memory controller 520_1 for the initial data 4/3 and the far memory controller 520_2 for the conditional data are coupled to the same physical memory channel 524 but, e.g., are located on different DIMM cards plugged into that memory channel 524. As such, the data 4/3 from the initial read request 2 is ultimately returned to the host side memory controller 516 and cached in a local cache 524. The host side memory controller 516 is able to determine the address for the dependent load and direct a read request 5 to the far memory controller 520_2 having the correct data.

The read is performed and conditional data 6 is forwarded to the requesting CPU. Depending on, e.g., a configuration register setting, the host side memory controller 516 may immediately determine the address of the dependent load once it receives the initial read data 4/3 and initiate a read request for the dependent load even if the read request from the prefetch instruction has not been received yet. Alternatively the host side memory controller 516 may be configured to wait for receipt of the read request for the dependent load before initiating a read request.

Again, the flow of FIG. 5 may be performed on a traditional system memory where the initial data and the conditional data are, e.g., found on different DIMM cards plugged into the same memory channel. Alternatively it may be performed on near memory in a multi-level system memory where near memory has its own reserved system memory address space.

Referring back to a multi-level system memory approach, again, FIG. 5 shows a flow if neither the initial load or the dependent load are found in near memory 513. the host side memory controller 516 is designed to handle hits/misses in near memory 513 for either the initial load or the dependent load in near memory cache 513 as described above with respect to FIG. 4. As with the flows of FIG. 4, the flows of FIG. 5 are compatible with implementations where the far memory controller function is integrated into the host side memory controller 516 (here channel 523 corresponds to an internal channel within the host side memory controller).

FIG. 6 corresponds to essentially the same flows described above with respect to FIG. 5 except that the far memory controller 620_1 for the initial load's data and the far memory controller 620_2 for the dependent load's data are on different physical memory channels 623, 625. Again, the host side memory controller 616 is designed to maintain information that describes which system memory channel is responsible for which system memory address range and can therefore readily determine when the initial load's address and the dependent load's address correspond to different physical channels. As with the flows of FIGS. 4 and 5, the flows of FIG. 6 are compatible with implementations where the far memory controller function is integrated into the host side memory controller 616 (here channels 623 and 625 correspond to an internal channel within the host side memory controller 616).

FIGS. 4 through 6 were directed to more local processes that respond to the prefetch instruction through a same host side memory controller. By contrast, FIGS. 7 and 8 are directed to more global processes that respond to the prefetch instruction and that include multiple memory controllers.

As observed in FIG. 7, a platform 721, such as a large scale SoC, a multi-chip module integrated in a single semiconductor package or one or more localized PC boards (e.g., a single PC board or multiple PC boards plugged into a same backplane) has multiple CPUs 701_1 through 701_N and multiple memory controllers 705_1, 705_2. Here, in various embodiments, each memory controller of the platform 721 is provided its own "slice" of system memory address ranges. Accordingly, it is possible that the initial load instruction has an address that corresponds to a first system memory address range that is handled by a first memory controller 705_1 and the dependent load has an address that corresponds to a second system memory address range that is handled by a second memory controller 705_2. Here, the main memory coherency function 704 maintains information that describes which memory controller is responsible for which system memory address range.

As such, the prefetching intelligence 730 is integrated into a main memory coherence function 704 that is responsible for understanding which system memory address ranges are handled by which memory controllers, and, directing read requests to the correct memory controller based on the respective read address of the read address requests.

According to the flow of FIG. 7, the prefetching intelligence 730 within the system memory coherency function 704 receives the read request 1 for the initial load operation and forwards it to the memory controller 705_1 that is responsible for the address range that the address of the initial read request 1 falls within. Because the initial read request 1, is intercepted by a higher level plane (the main memory coherency plane 704) than a lower level memory controller, the prefetch instruction is apt to be begun and its corresponding read request 2 received by the main memory control function 703 (at the main memory coherency plane 703) before the read data from the initial load 2 is actually read 3.

Any/all of the processes described above with respect to FIGS. 4 through 6 can take place at the memory controller 705_1 that handles the read of the initial load operation with the exception that the address for the expected dependent load (as calculated by prefetch intelligence associated with memory controller 705_1) does not match any addresses supported by memory controller 705_1. As such, memory controller 705_1, e.g., does not perform any read operations for the conditional load (other than automatic optimistic ones).

Ultimately, memory controller 705_1 forwards the initial read data toward the requesting CPU and the prefetch intelligence 730 from a higher plane main memory control function 704 issues a read request 4 to the memory controller 705_2 that handles the address of the conditional load. The determination of the conditional load's address may be determined by the memory controller 705_1 that handled the initial load (which forwards it to the higher plane memory control function 704, or, may be determined by the prefetch intelligence 730 of the higher plane memory control function 704). After the read request 4 for the conditional load is sent to the correct memory controller 705_2, the conditional data is read 5 from main memory and forwarded to the requesting CPU 701_N.

FIG. 8 shows a similar process but where the dependent load is off platform. That is, in the case of FIG. 8, the computing system may include multiple platforms such as platform 721 of FIG. 7 interconnected by a network 820. Here, each platform in the system is provided with its own slice/range of system memory addresses. The flow of FIG. 8 operates like the flow of FIG. 7 except that the main memory coherency function 803 recognizes, after the address of the conditional load is determined, that the address of the conditional load does not fall within the system memory address range slice that the platform 821 has been configured to handle.

That is, the main memory coherency function 803 is configured with information that describes the system memory address range that is supported by the platform 821 and any request for an address that falls outside this range is sent into the network 820. As such, the prefetch intelligence 830 forwards the read request 5 for the conditional load into the network 820 to be serviced 6 by another platform in the system. Note that a reverse flow is also possible where the initial load needs to be sent into the network 820 and the dependent load is serviced locally on the platform 821. In this case, the read result of the initial load should be sent back to the platform initially through the main memory control function 803.

The memory control function(s) and the prefetch intelligence discussed above can be implemented, e.g., as dedicated hardwired logic circuitry, programmable logic circuitry (e.g., field programmable gate array (FPGA), programmable logic array (PLA), etc.), logic circuitry that executes some form of firmware or other program code (e.g., an embedded controller, a controller, a micro-controller, an embedded processor, etc.) or any combination of these.

FIG. 9 shows a methodology described above. The methodology includes beginning executing of a load instruction 901. The methodology includes beginning execution 902 of a prefetch instruction before completion of the load instruction, where, the prefetch instruction is for a load operation whose address is dependent on the load instruction's read result. The method includes performing a) and b) below 903 with prefetch intelligence in a main memory control function: a) determining the address from the read result; b) fetching data with the address.

FIG. 10 shows a depiction of an exemplary computing system 1000 such as a personal computing system (e.g., desktop or laptop) or a mobile or handheld computing system such as a tablet device or smartphone, or, a larger computing system such as a server computing system. In the case of a large computing system, various one or all of the components observed in FIG. 10 may be replicated multiple times to form the various platforms of the computer which are interconnected by a network of some kind.

As observed in FIG. 10, the basic computing system may include a central processing unit 1001 (which may include, e.g., a plurality of general purpose processing cores and a main memory controller disposed on an applications processor or multi-core processor), system memory 1002, a display 1003 (e.g., touchscreen, flat-panel), a local wired point-to-point link (e.g., USB) interface 1004, various network I/O functions 1005 (such as an Ethernet interface and/or cellular modem subsystem), a wireless local area network (e.g., WiFi) interface 1006, a wireless point-to-point link (e.g., Bluetooth) interface 1007 and a Global Positioning System interface 1008, various sensors 1009_1 through 1009_N (e.g., one or more of a gyroscope, an accelerometer, a magnetometer, a temperature sensor, a pressure sensor, a humidity sensor, etc.), a camera 1010, a battery 1011, a power management control unit 1012, a speaker and microphone 1013 and an audio coder/decoder 1014.

An applications processor or multi-core processor 1050 may include one or more general purpose processing cores 1015 within its CPU 1001, one or more graphical processing units 1016, a main memory control function 1017 and an I/O control function 1018. The general purpose processing cores 1015 typically execute the operating system and application software of the computing system. The graphics processing units 1016 typically execute graphics intensive functions to, e.g., generate graphics information that is presented on the display 1003. The memory control function 1017 interfaces with the main/system memory 1002. The main/system memory may be a multi-level system memory. The main memory control function 1017 and one or more of the general purpose processing cores 1015 may support execution of a prefetch instruction and corresponding flows associated with a load instruction that its load is dependent upon as described above.

Each of the touchscreen display 1003, the communication interfaces 1004-1007, the GPS interface 1008, the sensors 1009, the camera 1010, and the speaker/microphone codec 1013, 1014 all can be viewed as various forms of I/O (input and/or output) relative to the overall computing system including, where appropriate, an integrated peripheral device as well (e.g., the camera 1010). Depending on implementation, various ones of these I/O components may be integrated on the applications processor/multi-core processor 1050 or may be located off the die or outside the package of the applications processor/multi-core processor 1050.

The system also includes non volatile storage 1020 which, e.g., can further broken into firmware BIOS storage and traditional mass storage. Here, the aforementioned SSD device can be used for either of these non volatile storage 1020 applications. Further still, the overall system of FIG. 6 as described above can also be conceivably used as a component of main memory 1002.

Embodiments of the invention may include various processes as set forth above. The processes may be embodied in machine-executable instructions. The instructions can be used to cause a general-purpose or special-purpose processor (e.g., a controller) to perform certain processes. Alternatively, these processes may be performed by specific hardware components that contain hardwired logic for performing the processes, or by any combination of software or instruction programmed computer components or custom hardware components, such as application specific integrated circuits (ASIC), programmable logic devices (PLD), digital signal processors (DSP), or field programmable gate array (FPGA).

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
   main memory control logic circuitry comprising prefetch intelligence logic circuitry to determine, from a read result of a load instruction, an address for a dependent load that is dependent on the read result and direct a read request for the dependent load to a main memory to fetch data of the dependent load, wherein, a prefetch instruction for the dependent load is permitted to begin execution before the load instruction completes.

2. The apparatus of claim 1 wherein the main memory is a multi-level main memory and the main memory control logic is a controller that interfaces to emerging non volatile memory devices of the multi-level main memory.

3. The apparatus of claim 1 wherein the main memory control logic is a controller that interfaces to emerging non volatile memory devices of the main memory.

4. The apparatus of claim 1 wherein the prefetch intelligence logic circuitry determines the address based on metadata contained in another read request received by the main memory control logic circuitry.

5. The apparatus of claim 1 wherein the read request is responsive to receipt by the main memory control logic circuitry of at least one of an earlier read request for the load instruction and a prefetch read request generated by the prefetch instruction for the dependent load executed by a processor that executed the load instruction.

6. The apparatus of claim 5 wherein at least one of the earlier read request and the prefetch read request include metadata that indicate a mathematical operation to be applied to the read result of the load instruction to determine an address of the dependent load.

7. The apparatus of claim 6 wherein the mathematical operation comprises an offset added to the read result of the load instruction.

8. The apparatus of claim 1 wherein the main memory control logic circuitry is a host side memory controller that interfaces to multiple physical memory channels.

9. The apparatus of claim 1 wherein the main memory control logic circuitry is part of a platform having multiple system memory controllers where the read result is from one of the memory controllers and the read request is directed to another one of the memory controllers.

10. The apparatus of claim 1 wherein the main memory control logic circuitry is part of a platform, the platform is part of a multi-platform computing system comprising multiple platforms where different platforms of the multiple platforms are connected by a network and where the read result and data of the dependent load are kept by the different platforms.

11. A computing system, comprising:
   a plurality of processing cores, at least one of the processing cores to execute a load instruction and a prefetch instruction, the prefetch instruction for a dependent load having an address that is dependent on read data of the load instruction, where, the prefetch instruction begins execution before the load instruction completes execution;

a network interface;

a main memory; and, main memory control logic circuitry comprising prefetch intelligence logic circuitry to determine, from the read data of the load instruction, the address for the dependent load and direct a read request for the dependent load to the main memory to fetch data.

12. The computing system of claim 11 wherein the main memory is a multi-level main memory and the main memory control logic is a controller that interfaces to emerging non volatile memory devices of the multi-level main memory.

13. The computing system of claim 11 wherein the main memory control logic is a controller that interfaces to emerging non volatile memory devices of the main memory.

14. The computing system of claim 11 wherein the prefetch intelligence logic circuitry determines the address based on meta data contained in another read request received by the main memory control logic circuitry.

15. The computing system of claim 11 wherein the read request is responsive to receipt by the main memory control logic circuitry of at least one of an earlier read request for the load instruction and a prefetch read request generated by the prefetch instruction.

16. The computing system of claim 15 wherein at least one of the earlier read request and the prefetch read request include metadata that indicated a mathematical operation to be applied to the read data of the load instruction to determine an address for the dependent load.

17. The computing system of claim 16 wherein the mathematical operation comprises an offset added to the read data of the load instruction.

18. The computing system of claim 11 wherein the main memory control logic circuitry is a host side memory controller that interfaces to multiple physical memory channels.

19. The computing system of claim 11 wherein the main memory control logic circuitry is part of a platform having multiple system memory controllers where the read data of the load instruction is from one of the memory controllers and the read request is directed to another one of the memory controllers.

20. The computing system of claim 11 wherein the computing system is a multi-platform computing system comprising multiple platforms interconnected by a network and the main memory control logic circuitry is part of one of the multiple platforms, and where the read data of the load instruction and data of the dependent load are kept by different ones of the multiple platforms.

21. A method, comprising:

beginning executing of a load instruction;

beginning execution of a prefetch instruction before completion of the load instruction, the prefetch instruction for a load operation whose address is dependent on a read result of the load instruction; and performing a) and b) below with prefetch intelligence in a main memory control function:

a) determining the address from the read result of the load instruction;

b) fetching data with the address.

22. The method of claim 21 further comprising delaying a beginning of execution of the prefetch instruction until confirmation that the main memory control function has received a read request for the load instruction.

23. The method of claim 21 wherein the main memory control function interfaces to a multi-level main memory.

24. The method of claim 21 wherein the main memory control function interfaces to main memory devices comprising non volatile random access memory technology.

25. The method of claim 21 wherein the prefetch instruction references the load instruction.

* * * * *